INVENTORS:
WILLIAM A. HOLMES,
ALFRED D. MACKENZIE,

BY Carl O. Thomas

THEIR ATTORNEY.

United States Patent Office 3,554,707
Patented Jan. 12, 1971

3,554,707
ATTITUDE INSENSITIVE GAS GENERATOR
William A. Holmes, Marblehead, and Alfred D. Mac-
Kenzie, Lynnfield, Mass., assignors to General Electric
Company, a corporation of New York
Filed Apr. 10, 1968, Ser. No. 728,378
Int. Cl. B01j 7/02
U.S. Cl. 23—282                                    5 Claims

ABSTRACT OF THE DISCLOSURE

A generator housing is formed with one or more bellows sections so that a liquid reactant is confined within the housing by the bellows regardless of the angular orientation of the generator. A solid body providing a reaction surface is centrally mounted within the enclosure. Upon contact of the liquid reactant with the solid body a gas is generated, but contact is destroyed by expansion of the bellows. A plurality of gas outlets are provided within the housing so that if one is submerged by liquid reactant, the remaining outlet will remain exposed for the eduction of gas.

---

Our invention relates to an attitude insensitive generator for producing gas by contact of a liquid reactant with a solid body providing a reaction surface.

The production of a gas by contact of a liquid and a solid is well understood in the art. A class of gas generators that has achieved substantial popularity includes those termed Kipp generators. These generators function by bringing a liquid reactant into contact with a reaction surface represented by a solid body. As gas accumulates within the generator, the liquid is slowly forced out of contact with the solid reaction surface so that the rate of gas evolution is reduced or stopped. When a portion of the gas is bled from the generator, the liquid reactant contacts the reaction surface and gas evolution again occurs. The simplicity of Kipp generators is that they are demand responsive—that is, they generate gas at the rate it is withdrawn from the generator. When gas removal is slowed, the evolution of gas slows proportionately. This is a significant advantage, since no elaborate controls are required to generate gas at the required rate. Rather, for most practical applications the generator is self-regulating.

Despite the significant advantages of Kipp generators, conventional Kipp generators suffer the notable disadvantage of being attitude sensitive. That is, if the generator is tilted or inverted in use, the self-regulating characteristics of the generator are destroyed and gas evolution may terminate or accelerate to a maximum and uncontrolled rate of evolution. Attitude sensitivity poses a significant obstacle toward utilizing Kipp generators for highly mobile applications. For example, where a gas generator is required to be utilized as a gas source for a small fuel cell unit powering a small portable radio receiver or transmitter, use of an attitude sensitive Kipp generator as a gas source could constitute a substantial inconvenience if not an actual hazard.

It is an object of our invention to provide a demand responsive gas generator that is attitude insensitive.

In one form our invention is directed to an attitude insensitive generator for producing gas by contact of a liquid reactant with a solid body providing a reaction surface. The generator is comprised of a fluid impervious enclosure means for confining the liquid reactant and the gas generated thereby. Means are provided for centrally positioning the solid body within the enclosure means. The enclosure means additionally includes fluid pressure expansible means for lowering the level of the liquid reactant out of contact with the solid body upon sensing a predetermined fluid in any angular attitude of the generator. Additionally means are provided for selectively withdrawing the gas generated from the enclosure means to permit the expansible means to contract and restore the level of the liquid reactant into contact with the solid body.

Figure 1:
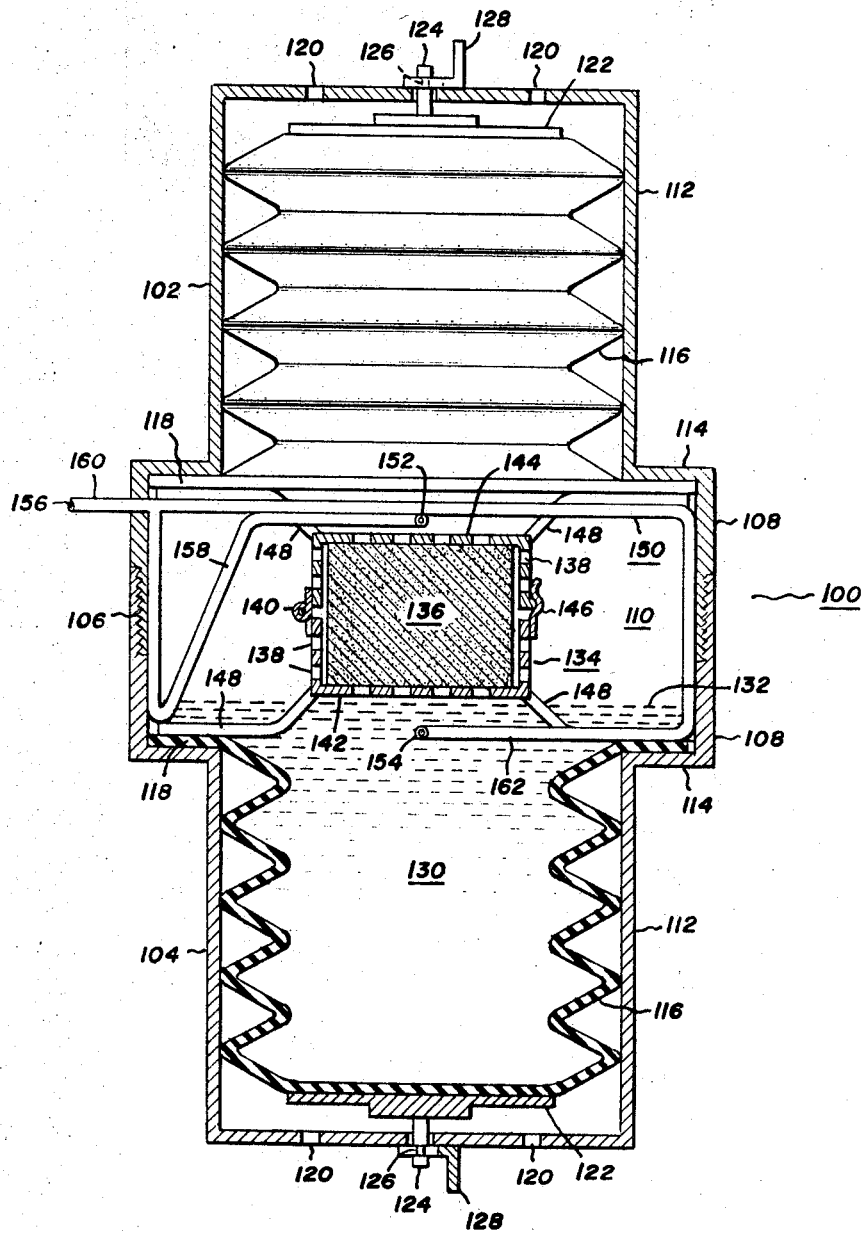
Figure 2:
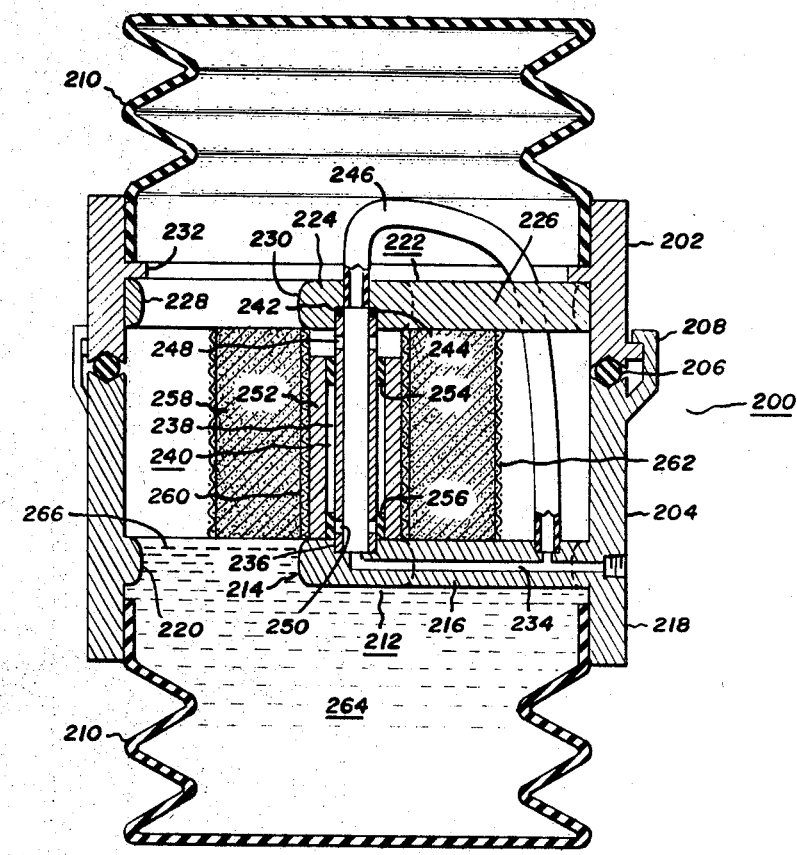
Figure 3:
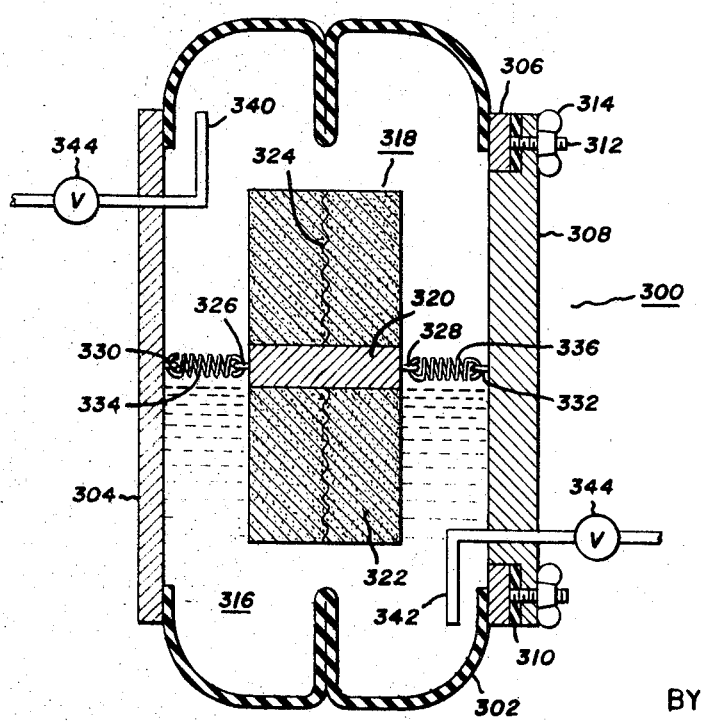

Our invention may be better understood by reference to the following detailed description considered in conjunction with the drawings, in which FIGS. 1, 2, and 3 are vertical sections of alternate generator constructions.

FIG. 1 illustrates a generator 100 comprised of an upper housing portion 102 and a lower housing portion 104. The housing portions are sealingly threadedly coupled at 106. In the form shown the housing portions are circular in horizontal section. Each housing portion is provided with an enlarged diameter portion 108 which cooperate to produce a central chamber 110. Each housing portion is provided with a reduced diameter portion 112 integrally united with the enlarged diameter portion by a flanged portion 114. An expansible bellows 116 is mounted within each reduced diameter portion and is provided with a radially outwardly extending lip 118 which is sealingly engaged with the flanged portions of the housing. To provide for the escape of air from the housing upon expansion of the bellows a plurality of apertures 120 are provided in the end walls of the reduced diameter portions. Attached to the outer end of each bellows is a plate 122 carrying a restraining pin 124. Each pin is grooved at 126 to cooperate with a forked catch 128.

When the bellows are held in the expanded position by the catches, a liquid reactant fills the lowermost bellows during the orientation of the generator shown, and the surface of the liquid reactant at 132 lies just beneath a positioning cage 134 in which a solid body 136 is located to provide a reaction surface with the solid reactant upon contact. The cage is provided with a multiplicity of apertures 138 distributed over its surface to permit the liquid reactant to enter the cage. In the form shown the cage is formed of upper and lower half shells 142 and 144 joined by a hinge 140. A fastener 146 releasably locks the half shells in closed relation around the solid body. A plurality of mounting legs 148 hold the cage in a central position within the central chamber regardless of the angular orientation of the generator.

To remove gas from the generator a conduit assembly 150 is positioned within the central chamber. The conduit assembly is provided with two gas inlets 152 and 154 and a gas outlet 156. The outlet and the inlet 152 are connected by a substantially recumbent segment 158 and an outlet segment 160 extending through the wall of the enlarged diameter portion of the upper housing portion. The recumbent segment of the conduit directs gas along a path substantially laterally displaced from a straight line path between the inlet and outlets. It is immaterial whether these are, or, are not coplanar. The recumbent segment lies within the central chamber so that the inlet 152 is centrally positioned as viewed in horizontal section but is vertically displaced above the positioning cage. The inlet conduit 154 is similarly located within the central chamber, except that it is located centrally below the positioning cage in the orientation shown in FIG. 1. The inlet conduit 154 is joined to the outlet segment by a diversionary segment 162 that directs gas first in a direction away from the gas outlet and then back toward the gas outlet.

In use of the generator 100, the upper housing portion 102 and the lower housing portion 104 are intially disconnected. Each bellows 116 is manually expanded so that the restraining pin 124 extends through an aperture 120. A forked catch 128 is then fitted into the groove 126 in the restraining pin to hold the bellows in expanded position. The lower housing portion is then filled with a liquid reactant 130 to a level 132. The positioning cage 134, which is initially separate from the housing portions, is opened by releasing the fastener 146 and pivoting the half shells 142 and 144 about the hinge 140. A solid body 136 providing a reaction surface upon contact with the liquid reactant is placed within the cage and the half shells are then returned to their fastened position. The positioning cage is then inserted between the housing portions, and the housing portions are threadedly and sealingly engaged.

At this time the liquid level lies primarily within the bellows of the lower housing portion and out of contact with the solid body. By properly proportioning the enlarged diameter portions, reduced diameter portions, bellows, and positioning cage, the liquid reactant will remain out of contact with the solid body regardless of the orientation of the gas generator so long as the catches hold the bellows expanded.

Also, it can be readily seen that no liquid reactant can escape from the generator through the conduit assembly 150 regardless of the orientation of the generator. In the position shown, for example, the liquid reactant is out of contact with the inlet 152 while the inlet 154 lies beneath the surface of the liquid. Liquid reactant does not flow through the diversionary segment 162, since this segment rises above the liquid level.

If the generator is rotated through 90 degrees in any direction from the position shown, the liquid level will be beneath the cage and out of contact with either of the inlets. If the generator is rotated 180 degrees from the position shown, that is, inverted, the liquid level will be above the inlet 152 but below the inlet 154. In this case liquid is prevented from leaving the generator, since the recumbent segment extends well above the level of the liquid.

From the foregoing it can be seen that with the bellows locked in the expanded position, the solid body and liquid reactant may be stored within the generator without danger that gas evolution will be started by tipping or even rotating the generator through 180 degrees. Further, there is no risk of liquid reactant draining from the generator when it is laid on a side or inverted. Additionally, no safety hazard is posed even if the liquid reactant and solid body should momentarily come in contact, as by jarring or vigorously shaking the unit, since a free path always exists whereby the gas formed can bleed from one or both inlets in the central chamber 110 to the outlet.

To place the generator in operation, it is merely necessary to release the catches from the grooves in the restraining pins. The natural resilience in the bellows will cause them to retract until the liquid reactant level is raised into contact with the solid body. The liquid gains free access to the body by passing through the ports 138 in the positioning cage. As gas is generated it may be withdrawn through either or both of the inlets which lie above the surface of the liquid.

If during operation the rate of gas evolution exceeds the rate of gas removal, a slight increase in gas pressure will occur within the generator. This will cause the bellows to expand and increase the volume which the liquid reactant can occupy. This drops the level of the liquid reactant so that the area of its contact with the solid body is reduced. If gas pressure continues to build the liquid level will drop lower and the contact between the solid body and liquid reactant will be entirely terminated. This will effectively stop gas generation until the pressure within the generator is lowered by the removal of gas from the generator. Thus, it is apparent that the generator is not only attitude insensitive, but also demand responsive. Accordingly a very simple and effective gas generator is provided.

FIG. 2 illustrates a functionally similar, but structurally dissimilar, gas generator 200. This generator is provided with an upper housing portion 202 and a lower housing portion 204 having an O-ring seal interposed therebetween. The housing portions are releasably held in assembled relation by a bayonet coupling. Each of the housing portions are provided with a bellows 210 sealingly cooperating therewith.

A spider 212 is integrally formed with the lower housing portion. The spider is made up of a central hub portion 214 from which a plurality of spokes 216 radiate to the exterior cylindrical wall 218 of the lower housing portion. The spokes define large windows 220 therebetween. The upper housing portion is provided with a separable spider 222 having a hub portion 224, spokes 226, and a rim portion 228. The rim portion and spokes together form large windows 230 therebetween. The rim of the upper spider cooperates with an annular shoulder 232.

One spoke of the lower spider is provided with a gas outlet passage 234. The hub of the lower spider is recessed to sealingly receive a valve conduit 238 of a gravity actuated valve assembly 240. The upper spider is recessed at 242 in its hub portion. Whereas valve conduit is fixedly sealed to the lower hub, the upper hub is separable from the valve conduit. To provide a seal between the valve conduit and the upper hub an O-ring seal is fitted in the recess 242. A gas eduction conduit is sealingly fixed to the upper hub at one extremity to communicate with the valve conduit and is sealingly fixed to the outlet passage containing spoke of the lower hub at its opposite extremity.

The valve conduit is provided with a plurality of upper valve ports 248 adjacent its upper extremity and a plurality of lower valve ports 250 adjacent its lower extremity. A gravity actuated annular valve sleeve 252 slidably surrounds the valve conduit and is provided with upper and lower slidable annular seals 254 and 256, respectively. The slidable seals are separated by a lesser distance than the valve ports.

An annular solid body 258 surrounds the valve assembly. To prevent the solid body from bearing against the valve sleeve an inner annular retaining screen 260 is provided which is preferably welded to the lower spider. An outer retaining screen 262 lies exteriorly of the solid body. This retainer screen is also preferably welded to the lower spider.

To place the generator 200 in use, the upper housing portion 202 is disconnected from the lower housing portion 204. A liquid reactant 264 is placed in the bellows 210 associated with the lower housing portion. Initially the level of the liquid as indicated at 266 is maintained below the upper edge of the lower spider. The solid body 258 is then positioned between the annular retaining screens 260 and 262.

The upper housing portion is fitted to the lower housing portion by positioning the upper spider 222 in engagement with the upper end of the valve conduit 238. The upper housing portion then rests on the O-ring seal 206, and the housing portions are fastened in assembled relation by bayonet coupling 208.

The generator 200 differs significantly from the generator 100 in that the housing makes no provision for holding the bellows in expanded condition prior to use. It is anticipated that the bellows may be formed to naturally assume the expanded configuration. In this instance gas will be generated only when a negative gas pressure exists within the generator as compared to the external ambient pressure. In this form the generator 200 may be stored with the reactants inside similarly as the generator 100. Where the bellows are normally resiliently biased toward the retracted or collapsed position, the generator may nevertheless be stored with the reactants inside merely by maintaining a slight positive pressure within the generator during storage to keep the bellows expanded.

As in the generator 100 the bellows, housing, and solid body may be proportioned so that the liquid reactant does not contact the solid body when the bellows are fully expanded, regardless of the orientation of the generator. As in the generator 100 gas is generated when the liquid level rises into contact with the solid body in response to contraction of the bellows. Gas evolution in excess of the rate of demand causes a slight positive pressure to develop within the generator so that the bellows expand and the level of the liquid reactant drops to reduce or eliminate liquid contact with the solid body.

The generator 200, like generator 100, is provided with an arrangement which prevents leakage of liquid reactant, regardless of orientation, and which allows the gas generated to be selectively removed. In the generator 200 this is accomplished by the valve assembly 240. When the generator is in the orientation shown in FIG. 2, entry of liquid reactant into the gas outlet passage 234 is prevented by the fact that the valve sleeve 252 is gravity biased to the position shown causing the slidable seal mounted by the valve sleeve to cover the valve ports 250. At the same time the valve ports 248 are exposed to permit gas to leave the generator. When the gas generator is rotated 90 degrees, both of the valve ports are in contact with gas and out of contact with liquid. If the generator is rotated through 180 degrees, i.e., inverted, the valve sleeve moves from the position shown to bring the slidable seal 254 over the valve ports 248. Fluid exit from the lower valve ports is again prevented while gas exhaust through the upper valve ports, in this case valve ports 250, is permitted.

FIG. 3 illustrates a generator 300 comprised of a central expansible bellows 302 sealingly affixed along one annular edge to a mounting disc 304. Along its remaining annular edge the bellows is sealingly affixed to an annular mounting ring 306. A cover plate 308 is positioned in sealing and removable engagement with the mounting ring by means of gasket 310, stud bolts 312, and wing nuts 314.

A liquid reactant 316 is held within the enclosure formed by the mounting disc, bellows, and cover plate. A solid body 318 is centrally positioned with the enclosure. As shown, the body is provided with a core 320 formed of a chemically inert material having appreciable tensile strength. Molded around the core is a body portion 322 which provides a reaction surface upon contact with the liquid reactant. As an optional feature a reinforcing screen 324 is shown embedded in this body portion to insure structural integrity of the body portion during gas generation. The core is provided with eyelets 326 and 328. The mounting disc and cover plate are also provided with centrally located eyelets 330 and 332, respectively. Cooperating with and extending between the eyelets 326 and 330 is a tension spring 334 while a similar tension spring 336 cooperates with the eyelets 328 and 332.

To permit gas to be selectively withdrawn from the generator and to prevent liquid withdrawal, except as desired, conduits 340 and 342 are provided sealingly extending through the mounting disc and cover plate, respectively. Each conduit is controlled by a valve 344 located exteriorly of the enclosure.

Like generators 100 and 200, the generator 300 is attitude insensitive and demand responsive. To activate the generator the cover plate 308 is removed and liquid reactant 316 introduced. The solid body is then introduced by attachment to the tension springs 334 and 336. With the uppermost of the conduits 340 and 342 maintained in an open condition by the valve 344 the cover plate is sealingly fitted to the mounting ring. When the cover plate is in position, both valves 344 may be closed and the bellows 302 will expand to lower the level of the liquid reactant out of contact with the solid body. The liquid reactant will remain out of contact with the solid body regardless of the orientation of the generator. When it is desired to withdraw gas from the generator, the uppermost of the conduits 340 and 342 are chosen for gas supply and the valve 344 opened.

Many choices of solid and liquid reactants which react on contact to generate a gas are known to the art. For example, when a metal lying higher in the electromotive series than hydrogen is contacted with an acid it will react to liberate hydrogen from the acid. Hydrogen is commonly generated in Kipp generators by contacting zinc or aluminum with a strong alkali or by contacting magnesium with saline water. Hydrogen may also be generated by contacting hydrides with water. Certain novel approaches for the generation of hydrogen compatible for practice with our invention are disclosed by Bullock et al., in Ser. No. 669,239, filed Sept. 20, 1967; Holmes in Ser. No. 672,283, filed Oct. 2, 1967 and now abandoned; Kummins in Ser. No. 669,323, filed Sept. 20, 1967 and now abandoned; and Cliche et al., in Ser. No. 720,181, filed on even date herewith, and titled Process and Apparatus for Hydrogen Generation. The disclosures of each of these applications are incorporated by reference.

Referring the Cliche et al. application, it is apparent that the solid body need not itself be a reactant but may provide catalytically active surface for the reaction of reactants contained entirely within the liquid reactant. When the reactants disclosed by Cliche et al. are utilized, the solid bodies within our gas generators are catalytically active bodies which are not consumed in use. In such circumstance to mount the solid body for removal from the gas generator, the solid body may be simply fixedly mounted centrally within the generator for the life of the generator. Additionally, where the solid body is a catalytically active body, it may occupy significantly less volume than where the solid body is itself a reactant. For example, in the generator 200 the restraining screen 260 could be catalytically activated and the screen 262 and removable solid body 258 omitted entirely. In the generator 300 the reinforcing screen may be catalytically active and the body portion 322 omitted entirely.

While the generators illustrated represent preferred embodiments of our invention, it is appreciated numerous structural variations may be introduced without departing from our teachings. For example, in order to construct a generator according to our invention, it is only necessary that a fluid impervious enclosure means be provided. One or more portions of the enclosure means must be expansible in response to a fluid pressure within the enclosure means. The generators 100 and 200 are illustrated comprised of two bellows each, but it is apparent that any number of equally spaced bellows may be utilized—three, four, or even more. The generator 300 is intended to illustrate the limiting case where the entire periphery is merged into one continuous bellows. While bellows are illustrated and described, it is recognized that they may be replaced by expansible wall portions of other constructions, such as an elastic wall or a piston sealingly and slidably fitted within the housing and preferably biased to the retracted position. Where the solid body is a catalyst and not required to be serviced during the working life of the generator, it is appreciated that the enclosure means may take a unitary form with fluid conduits utilized to introduce fluid reactant and remove reaction products. The generator 300 may be usefully modified in any event to incorporate a fluid conduit to allow fluid to be introduced after the solid body is placed in position and the closure plate sealed in position.

It is recognized that many features of the generators specifically illustrated may be interchanged. For example, the systems for selectively removing gas but not liquid from the generators are considered to be interchangeable without the exercise of invention. The provision of a reduced diameter housing portion and means to lock the bellows in expanded condition may be omitted from the generator 100 and/or incorporated as an added feature in the generator 200 without the exercise of invention. The use of a threaded coupling for housing portions in the generator 100 and a bayonet coupling for the housing portions of generator 200 could be reversed. Alternatively, any other type of conventional coupling arrangement could be utilized.

In the generator 100, the incorporation of restraining plates and pins for the bellows is not essential. The use of a forked catch to hold the pins is optional; any other conventional removable catch may be substituted. The use of a positioning cage for the solid body is intended merely to illustrate one specific means to hold the solid body centrally within the central chamber as it is consumed while allowing the solid body some latitude to settle toward the lower portion of the cage and remain in contact with the liquid reactant. Any conventional alternate type of cage arrangement may be substituted. The conduit assembly 150 need not be constructed in the identical form shown. Instead of forming the conduit of one recumbent segment and one diversionary segment, the conduit assembly may be formed with two recumbent segments or two diversionary segments or the use of recumbent and diversionary segments interchanged. For this purpose a recumbent segment is considered one that contains a substantial lateral digression between its inlet and outlet. A diversionary segment is one that extends further from the outlet than the inlet. The exact path through which these conduits follow is not critical.

In the generator 200 either or both spiders may be formed separate or integral with the housing portions. It is immaterial whether or not the spiders have rim portions or, if provided with rim portions, whether or not the spiders have more than one spoke. A flexible conduit is illustrated connected to the hub of one spider while fluid is removed from the hub of the remaining spider by a passage through a spoke. Gas removal may be provided entirely by conduits or entirely by passages confined within spokes. The advantage of external conduits is that they are relatively cheap to build into the system, while passages within spokes add to the cost of initially constructing the generator, but render it a somewhat simpler final product. It is not essential to utilize the valve assembly illustrated, but other gravity actuated valves may be substituted. It is recognized that it is not essential to sealingly close the valve ports 248 in order to allow gas to selectively escape from the generator, although this will allow some liquid to enter the gas exhaust passages. The use of retaining screens or similar porous retaining structures is not essential, but is preferred to insure free movement of the valve sleeve.

In the generator 300 it is recognized that it is not essential to use tension springs to centrally mount the solid body. If desired, the solid body may be linked to the mounting disc and closure plate by fixed length connectors. In this circumstance expansion and contraction of the enclosure means is limited entirely to the bellows with the other portions of the enclosure means lying in fixed relation. In an alternate approach the solid body may be mounted centrally by suitable connections to the surrounding central portion of the bellows.

While we have described our invention with reference to certain preferred embodiments and have described certain variations, it is appreciated that many other variations will be readily suggested to those skilled in the art. It is accordingly intended that the scope of our invention be determined with reference to the following claims.

What we claim and desire to secure by Letters Patent of the United States is:

1. An attitude insensitive generator for producing gas by contact of a liquid reactant with a solid body providing a reaction surface comprised of fluid impervious enclosure means for confining the liquid reactant and the gas generated thereby comprising an enlarged diameter housing means defining a central chamber, a plurality of expansible means sealingly secured to said housing means, reduced diameter housing means surrounding each of said bellows, means cooperating with said reduced diameter housing means for releasably locking each of said bellows in an expanded condition, positioning means for receipt of the solid body, means for locating said positioning means centrally within the central chamber, and means for selectively removing gas from the central chamber including means for receiving gas centrally located adjacent each surface of said positioning means adjacent one of said expansible means.

2. A generator according to claim 1 in which said expansible means are bellows.

3. A generator according to claim 1 in which said means for selectively removing gas includes a recumbent conduit segment.

4. An attitude insensitive generator for producing gas by contact of a liquid reactant with a solid body providing a reaction surface comprised of fluid impervious enclosure means for confining the liquid reactant and the gas generated thereby comprising first and second housing portions, means for sealingly and releasably coupling said housing portions, and expansible means sealingly cooperating with each of said housing portions, means for positioning the solid body within an annular area centrally located within said housing portions, and means for selectively removing gas from said fluid impervious enclosure means comprised of valve means centrally located within said housing portions and interiorly of the annular area comprised of conduit means extending between said expansible means cooperating with said first and second housing portions, said conduit means having a valve port adjacent one extremity, gravity actuated valve sleeve means slidably positioned around said conduit means, and seal means carried by said valve sleeve means for selectively opening and closing the valve port in response to gravity actuation of said valve sleeve means.

5. A generator according to claim 4 in which said conduit means is provided with a valve port adjacent each extremity and said valve sleeve means carries seal means for selectively opening and closing each of the valve ports in response to gravity actuation of said valve sleeve means.

References Cited

UNITED STATES PATENTS 150,995    5/1874    Zwietusch _____ 23—282

JAMES H. TAYMAN, JR., Primary Examiner

U.S. Cl. X.R.

23—211, 221, 252; 48—30